(12) United States Patent
Micheloni et al.

(10) Patent No.: US 7,730,357 B2
(45) Date of Patent: Jun. 1, 2010

(54) INTEGRATED MEMORY SYSTEM

(76) Inventors: Rino Micheloni, Via IUini, 11, I-22078 Turate (CO) (IT); Roberto Ravasio, Via Mazzini,3, I-24036 Ponte San Pietro (BG) (IT)

( * ) Notice: Subject to any disclaimer, the term of this patent is extended or adjusted under 35 U.S.C. 154(b) by 798 days.

(21) Appl. No.: 10/805,182

(22) Filed: Mar. 19, 2004

(65) Prior Publication Data

US 2004/0230869 A1 Nov. 18, 2004

(30) Foreign Application Priority Data

Mar. 19, 2003 (EP) .................................. 03425171

(51) Int. Cl.
*G06F 11/00* (2006.01)
(52) U.S. Cl. .................. 714/42; 714/5; 714/6; 714/30; 714/773; 711/102
(58) Field of Classification Search ............. 714/5, 714/764, 6, 30, 42, 773, 25; 711/102, 103, 711/104
See application file for complete search history.

(56) References Cited

U.S. PATENT DOCUMENTS

| | | | |
|---|---|---|---|
| 5,533,035 A * | 7/1996 | Saxena et al. ................ 714/761 |
| 5,922,080 A | 7/1999 | Olarig | |
| 6,802,040 B1 * | 10/2004 | Ohyama et al. .............. 714/781 |
| 6,996,741 B1 * | 2/2006 | Pittelkow et al. ................ 714/5 |
| 7,134,069 B1 * | 11/2006 | Longwell et al. ............ 714/800 |
| 2002/0069317 A1 * | 6/2002 | Chow et al. .................. 711/104 |
| 2002/0174397 A1 * | 11/2002 | Furukawa .................... 714/764 |
| 2003/0126513 A1 * | 7/2003 | Wuidart ....................... 714/42 |
| 2004/0015771 A1 * | 1/2004 | Lasser et al. ................. 714/763 |

FOREIGN PATENT DOCUMENTS

JP 2001-175542 6/2001

OTHER PUBLICATIONS

Null, Linda. "The Essentials of Computer Organization and Architecture." Copyright 2003. Jones and Bartlett. pp. 73-77, 106.*
European Search Report dated Sep. 23, 2003 relating to the above prior art.

* cited by examiner

*Primary Examiner*—Robert Beausoliel
*Assistant Examiner*—Joseph D Manoskey
(74) *Attorney, Agent, or Firm*—Trop, Pruner & Hu, P.C.

(57) ABSTRACT

An embodiment of the present invention relates to an integrated memory system comprising at least a non-volatile memory and an automatic storage error corrector, and wherein the memory is connected to a controller by means of an interface bus. Advantageously, the system comprises in the memory circuit means, functionally independent, each being responsible for the correction of a predetermined storage error; at least one of said means generating a signal to ask a correction being external to the memory.

18 Claims, 4 Drawing Sheets

INTEGRATED MEMORY SYSTEM

PRIORITY CLAIM

This application claims priority from European patent application No. 03425171.0 filed Mar. 19, 2003, which is incorporated herein by reference.

TECHNICAL FIELD

In its more general aspect, an embodiment of the present invention relates to the field of memory systems comprising at least a non-volatile memory and a controller.

Such a system can be an independent information storage unit or it can be used as a control or processing unit for a general application.

More particularly, an embodiment of the invention relates to an integrated memory system comprising at least a non-volatile memory and an automatic error corrector.

BACKGROUND OF THE INVENTION

In this specific technical field, it is well known that in an information storage unit (FIG. 2) the controller functions to provide an interface for the user, according to a predetermined convention, by using an interface and some services made available by the memory.

This is the typical condition of storage systems like disk-on-chip, memory card or smart card, as schematized in the here-attached FIG. 2.

In a general control unit (FIG. 3) a predetermined software level attends to providing interface functions to overhanging software levels by using said interface and services made available by the memory.

In an ideal system, without errors, the memory receives/sends the data sent/required by the controller without error possibility.

In a real system, however, it is almost impossible to send and store data without errors.

Data-storage flash memories use the most developed technologies to integrate the most information per area unit. For these applications NAND, Multilevel NAND and Multilevel NOR memories are commonly used. Error probability of these memories increases as the memory ages because of well-known physical phenomena.

For example, in a floating gate memory cell, the information storage capacity is influenced by several mechanisms, such as: the ability to maintain charge, the "read disturb" mechanism, the "program disturb" mechanism, the SILC phenomenon, each having a different influence as the memory ages.

In substance, the error tolerance which must be offered by the memory system is determined by the kind of application required by the user and it is usually lower than the error tolerance offered by flash memories during their life span.

A convenient memory system must provide some devices and functions to show externally, or at overhanging levels, an error tolerance being lower or equal to the one required by the application. This is commonly achieved by using error correction techniques.

These error correction techniques provide that the information is split in words of K bits and that these words are conveniently coded with N bits, where R redundancy bits are added to the K information bits. Only at this point are words written in the memory.

During the information reading, the K original information bits are decoded from the N bits read by the memory.

The presence of R redundancy bits allows the original information to be recovered if the error number is lower than W. Different codings for the K information bit protection from W errors by coding on N bits are known in the prior art.

For convenience of illustration, a practical case of a linear and systematic coding (144, 128) for correcting two errors (N=144 bits, K=128 bits, W=2 bits) will be considered hereinafter.

With reference to FIG. 6, the coding and decoding of such a code can be summarised as follows:

The vector "c" to be stored, composed of 144 bits, is obtained as a vector product of "i", a 128-bit data vector, with the binary generating matrix "G" composed of 128 rows by 144 columns. In the particular linear and systematic coding case G is composed of an identity matrix I and a parity matrix P. The vector "c" being obtained thus comprises the repetition of the data vector "i" and the parity vector is obtained as vector product iP. Formally expressed:

$$c = i \cdot G = i \cdot [I,P] = [i, iP]$$

The matrix P is a binary matrix of size 128×16 being conveniently chosen (a method for obtaining this matrix is known in the art).

For the decoding step a so-called syndrome "s" must be calculated:

$$s = r \cdot H^T = p \oplus + d \cdot P$$

where $$G \cdot H^T = 0$$

The syndrome "s", a 16-bit vector, is obtained as a vector product between the vector "r", a data vector of 144 bits read by the memory and composed of a 128-bit data part "d" and a 16-bit parity part "p", and the transpose of the matrix H. It can be shown that the syndrome is equivalent to the sum in GF(2) of the parity vector "p" with the vector product of the vector d with the parity matrix P.

The syndrome s is void if the data vector "r" is correct; while, according to the way the matrix P is defined, "s" has a sole value for each possible configuration of one or two errors affecting "r".

To achieve this coding and decoding scheme some solutions are known, which are schematically shown in FIGS. 4a and b.

In the first solution of FIG. 4a a general memory is used. This memory stores data "i" and parity bits "iP", calculated by the controller. The coding and decoding task for correcting errors is entrusted to the controller.

The disadvantages of this solution are:

high latency time between the data request and the availability thereof.

In fact standard flash memories use a limited-size interface bus to communicate with the controller. Although the memory internal reading is commonly performed for pages having several bits (for example 144 bits), the communication towards the controller is bound to a word sequence on the data bus. Since for calculating the syndrome, and thus for detecting and correcting the error, all the page bits are necessary, data are available for the user only after transferring all K bits of the page (data+parity) in the controller and after calculating the parity.

a memory overhead in the controller.

In fact the K bits of the page (data+parity) must be loaded in the controller memory with subsequent occupation of a controller memory area.

an overhead in the controller processing resources.

In fact the controller must, for each data page, read all K bits of the page (data+parity). For each page it must therefore calculate the parity and, if the latter indicates an error, activate the correction.

For performing these operations the controller requires a calculation power overhead so as not to influence the memory system overall performances; moreover a part of the transmission band between the memory and the controller is used for transmitting parity bits being not strictly necessary for the user application.

In this second prior art solution, shown in FIG. 4b, the coding and decoding task is entrusted to the memory. The syndrome decoding for correcting two errors is generally too onerous in terms of area to be advantageously implemented in the memory.

The technical problem underlying an embodiment of the present invention is to provide an integrated memory system, having such structural and functional characteristics as to ensure an automatic error correction in data storage overcoming the drawbacks mentioned with reference to the prior art.

SUMMARY

A solution underlying an embodiment of the present invention provides the possibility and opportunity to split the correction in different processes to be performed directly in the memory or in the controller.

On the basis of this solution, the technical problem is solved by a memory system.

DESCRIPTION OF THE DRAWINGS

The features and advantages of the system according to the invention will be apparent from the following description of at least one embodiment thereof given by way of non-limiting example with reference to the attached drawings.

DETAILED DESCRIPTION

Figure 5:
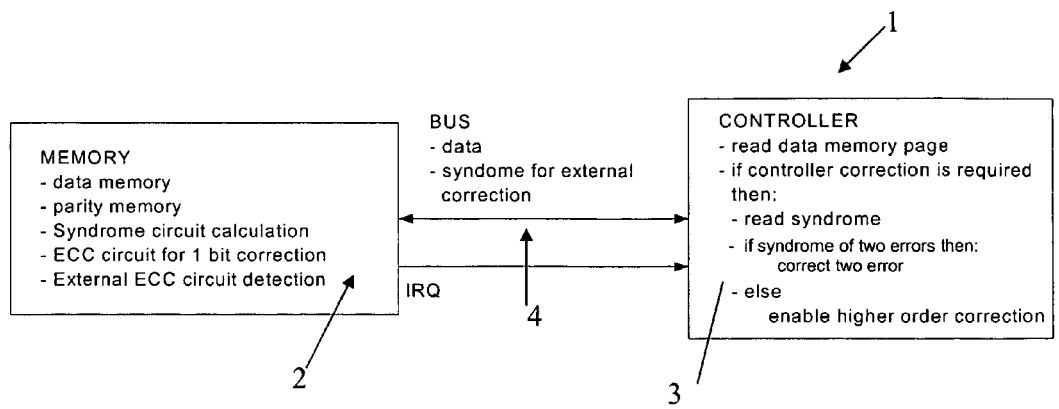
FIG. 5 schematically shows a memory system according to an embodiment of the invention incorporating devices for the automatic error correction.

With reference to the drawings, and particularly to the example of FIG. 5, a memory system in accordance with an embodiment of the present invention to store data and information in binary logic is globally and schematically indicated with 1.

Figure 1:
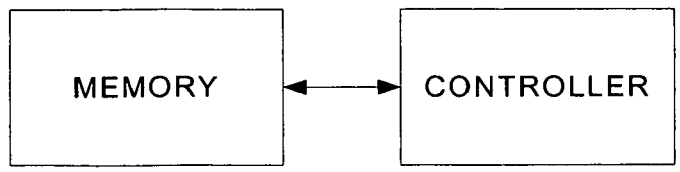
FIG. 1 is a schematic block view of a prior-art memory system incorporating at least a non-volatile memory and a controller.
Figure 2:
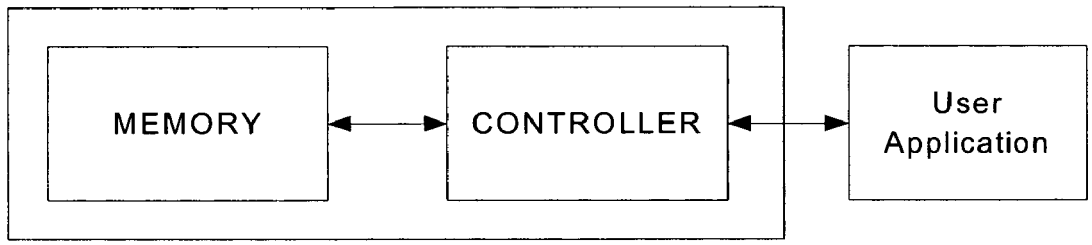
FIG. 2 is a schematic block view of the system of FIG. 1 used as an information storage unit.
Figure 3:
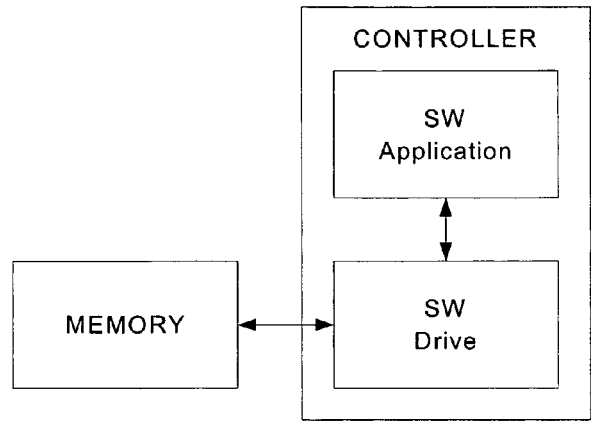
FIG. 3 is a schematic block view of the system of FIG. 1 used as a control or processing unit.
Figure 4A:
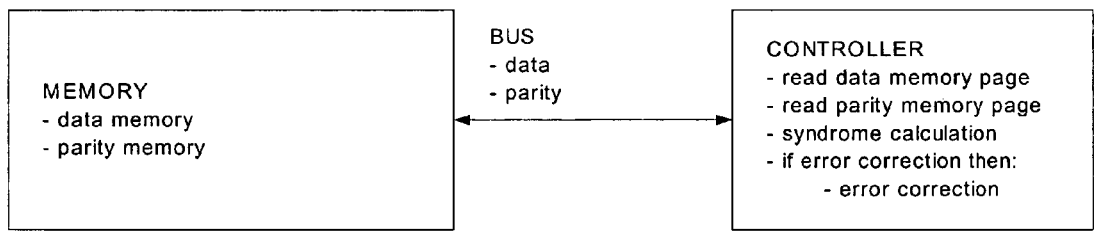
FIG. 4a schematically shows a prior-art memory system equipped with devices for the automatic error correction.
Figure 4B:
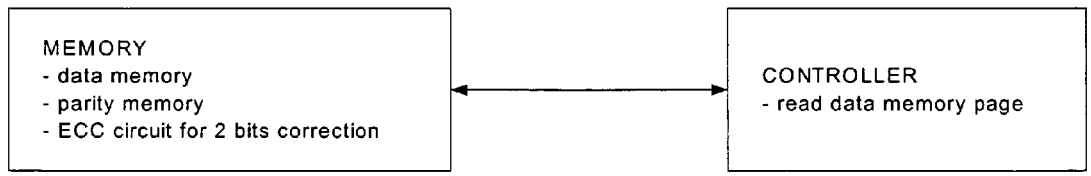
FIG. 4b schematically shows a further prior-art memory system equipped with other devices for the automatic error correction.

Such a system can be an independent information storage unit (FIG. 2) or it can be used as a control or processing unit for a general application (FIG. 3).

The system 1 comprises at least a non-volatile memory 2, for example of the Flash type, and a controller 3 associated to the memory 2 by means of an interface bus 4.

Non-volatile memories are electronic devices integrated on a semiconductor and equipped with memory cell matrices, particularly multilevel cells.

More particularly, memory device means any monolithic electronic system incorporating a memory cell matrix, organized into rows, referred to as word lines, and columns, referred to as bit lines, as well as circuit portions associated to the cell matrix and responsible for addressing, decoding, reading, writing and erasing the memory cell content.

Such a device can be for example a memory chip integrated on a semiconductor and of the non-volatile EEPROM flash type split in sectors and electrically erasable. Each memory cell comprises a floating gate transistor with source, drain and control gate terminals.

The memory system 1 is advantageously equipped with a particular device for the automatic correction of storage errors.

In particular, the system 1 provides the possibility and opportunity to split the correction in different processes to be performed directly in the memory 2 or in the controller 3.

Figure 6:
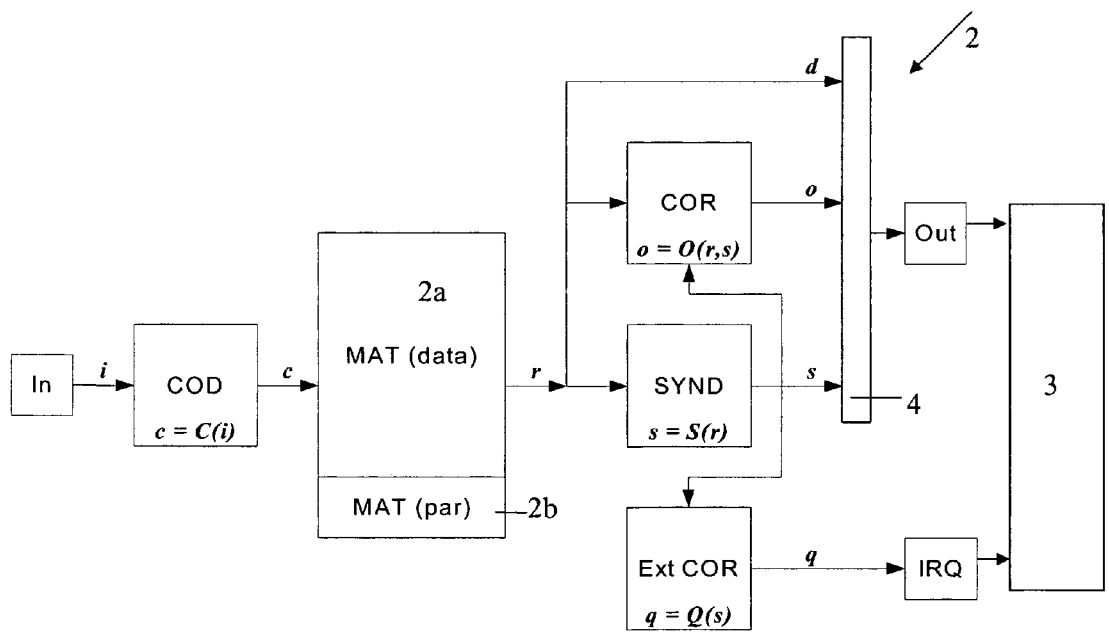
FIG. 6 is a schematic block view of a non-volatile memory portion incorporated in the system of FIG. 5 according to an embodiment of the invention.

As shown in FIG. 6, the structure of the memory system 1 is illustrated as a set of functional blocks located between an input terminal In and an output terminal Out.

Memory 2 comprises, besides respective areas 2a, 2b for data and parity storage:
- circuits COD for the coding required to correct two errors;
- a logic SYND for calculating the syndrome s;
- a circuit COR for correcting a single error; and
- a logic Ext COR for detecting more than one error.

As illustrated, the memory 2 is coupled to a bus 4 in order to provide the following to the controller 3:
- a one-or-no-error-corrected data;
- the uncorrected error;
- the calculated syndrome s;
- a signal IRQ activated to request the external correction.

FIGS. 7 to 10 show in schematic blocks the different blocks composing the memory 2 for a linear and systematic coding.

Figure 7:
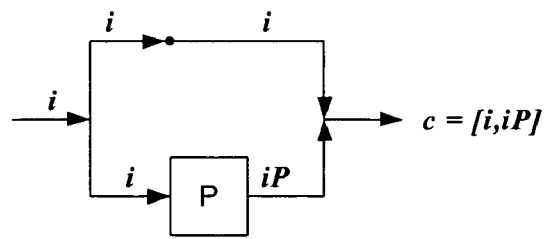

FIG. 7 shows the coding block COD located immediately downstream of the input terminal.

The vector product iP, performed by the block P, has a limited circuit complexity, proportional to the number of parity bits, and it is obtained through the synthesis of the corresponding logic function: c=[i, iP].

Figure 8:
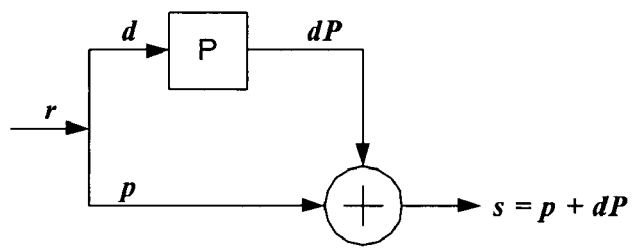

FIG. 8 shows the block SYND for calculating the syndrome s=p+dP.

The calculation of the syndrome s uses almost integrally the parity calculation circuit used for the coding COD.

Figure 9:
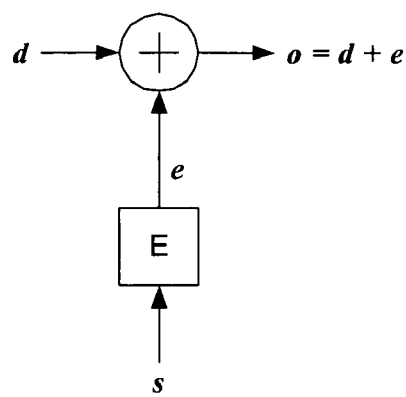

FIG. 9 shows the block COR for correcting one error and the block for requiring the external correction Ext COR with o=d+e.

The block for decoding a single error includes a decoding circuit E, of limited complexity, proportional to the number of single errors to be corrected.

This block is obtained through synthesis of the functional description thereof. In practise, the block E recognises each one of the 128 syndromes associated with a single error and it activates, through the vector "e", the correction of the corresponding bit.

If there are no errors to be corrected (s=0) or the syndrome value does not belong to the set of single errors, the vector "e" is void and the original data d is output.

Figure 10:
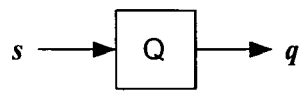
FIGS. 7 to 10 are respective schematic block views of components of the memory of FIG. 6 according to an embodiment of the invention.

FIG. 10 shows a simple activation block of a signal q being simultaneously activated when the intervention of the external correction is required.

The memory system 1 according to an embodiment of the invention, incorporating the previously mentioned correction blocks, uses the high parallelism available on the reading path. In fact, the parallel reading of a 144-bit data page and the writing, i.e., the parallel programming of a 144-bit data page, are only available for memory-integrated coding, decoding and correction solutions.

The operating method of the memory system according to an embodiment of the invention will now be described.

A first error-correction process relates to the determination of the syndrome "s" and to the correction of single errors, performed in the memory 2.

These functions are sufficiently simple from a circuit point of view so as to be advantageously performed in the memory 2.

Since memory 2 simultaneously comprises all K bits of the read page (data+parity), the calculation of the syndrome s and the single-error correction can be immediately performed.

This allows the corrected data to be transferred to the controller 3, immediately and with minimal latency, with no need to also transfer the parity. Therefore the bus band for the parity transfer is not occupied.

If several errors occur, the memory 2 immediately indicates to the controller 3, through the dedicated IRQ line, the need to perform an external correction, in this case any alteration is applied on read data.

The correction of all double errors, performed by the controller, will now be described.

When, after a data request, the controller 3 receives from the memory 2 the indication that two or more errors occurred, the normal data transfer is interrupted.

The syndrome s calculated in the memory 2 is read. If the syndrome is associated to a double error, the locations of the error-producing bits are detected, data are then read by the memory 2 and corrected where they must be corrected.

This operation is not very frequent and more complex than the single error correction; in fact it requires more memory or calculation capacity, and can be advantageously performed by the controller without endangering system performances.

Other particular cases will now be described:
1) The correction of more than two errors indicated by the syndrome s (Controller or user SW)

If the syndrome calculated in the memory is not associated to any error, neither single nor double, it serves as a detector of three or more errors.

The capacity of detecting all or a part of higher-order errors (3, 4, . . . ) exclusively depends on the chosen parity matrix. The detection of a higher-order error (i.e., higher than 2) allows the controller 3 to use this information to activate the decoding of a correction code at a higher software level, on the same set of data or on a larger size set.

The single errors being already corrected inside the memory and double errors being already corrected through the parity calculated in the memory, the events with three or more errors are extremely rare and, although the correction thereof is complex, they do not significantly affect system performances.

The controller 3 overhead is limited to the correction of two errors, when explicitly required by the indication from the memory and it is limited to the reading of the syndrome s, calculated in the memory, and to the correction of double errors.

If the probability to have an error in a 128-bit page is for example $10^{-5}$, the probability to have two errors is about $10^{-10}$, the number of interventions by the controller 3 is therefore reduced by five quantities. The probability to have more than two errors is about $10^{-15}$ and thus extremely improbable.

When required by the memory, through the IRQ signal, the controller provides to:
read the syndrome s
calculate the two bits to be redounded through one of the following two methods:

searching, on an ordered table, the syndromes of two errors. This method requires an ordered table of the N(N−1) syndromes associated to two error-producing bits and a number of operations equal to O(Nlog N).
2) Comparing all the syndromes obtainable as sum of two rows of the parity P matrix.

If the search detects the couple of error-producing bits, then the data reading, the correction thereof and the transmission to the user are performed.

If the search does not detect the couple of error-producing bits, this means that the syndrome indicates the presence of three or more errors. The controller or driver SW asks the higher SW levels to correct these errors.

The memory system 1 may be part of an electronic system, such as a computer system.

It will be evident to the expert in the art how to apply the error-correction devices according to an embodiment of the present invention also to other circuit solutions allowing a split of the single error correction functions. For example the principles of an embodiment of the present invention can be applied also when the error-correction system is taken from the memory and integrated in a coprocessor or in an accelerator in the control unit.

What is claimed is:

1. An integrated memory system, comprising;
a non-volatile solid-state memory;
an automatic storage error corrector including functionally independent devices, each device to correct a different predetermined storage error of data stored in the memory, at least one of said devices being external to the memory; and
a circuit, in said memory, to request external correction of an error.

2. A system according to claim 1, wherein said memory is connected to a controller by means of an interface bus and said devices are incorporated both in the memory and in the controller.

3. A system according to claim 1, including coding circuits to correct two errors, a logic to calculate a syndrome, a single error correcting circuit, and a logic to detect more than one error.

4. A system according to claim 3, further including a logic to supply the controller with a one-or-no-error-corrected data, the uncorrected error, and the calculated syndrome.

5. A system according to claim 2, said circuit to generate a signal to request correction by said controller.

6. A system according to claim 3, wherein said coding circuits are located immediately downstream of the input terminal of said memory to perform a vector product proportional to the number of parity bits and obtained through the synthesis of a corresponding logic function.

7. A system according to claim 6, wherein said logic to calculate the syndrome to use a parity calculation circuit of the coding circuits.

8. A system according to claim 3, wherein said single error correcting circuit for an error comprises a block to decode a single error effective to recognize each of the several syndromes associated to a single error to activate, through a corresponding vector, the correction of the corresponding bit.

9. A system, comprising;
- a first circuit operable to store data in a non-volatile solid-state memory, the data having associated therewith at least one storage error of a plurality of storage-error types, the first circuit operable to correct a first-type error of the plurality of storage-error types;
- a second circuit coupled to the first circuit, the second circuit operable to correct a second-type error of the plurality of storage-error types; and
- a third circuit coupled to one of said first or second circuits to request correction of an error externally to said memory.

10. The system of claim 9 wherein the second circuit to generate a signal requesting correction of a third-type error of the plurality of storage-error types.

11. The system of claim 9 wherein the first circuit further to determine at least one syndrome associated with the at least one storage error.

12. The system of claim 9 wherein the first circuit further to detect the second-type error.

13. The system of claim 9 wherein the second circuit to correct the second-type error in response to a signal generated by the first circuit.

14. The system of claim 9 wherein the first circuit comprises a non-volatile memory.

15. The system of claim 9 wherein;
- the first circuit is disposed on a first integrated circuit; and
- the second circuit is disposed on a second integrated circuit.

16. The system of claim 9 wherein the first and second circuits are disposed on an integrated circuit.

17. A memory device, comprising;
- a non-volatile solid-state storage portion to store data having associated therewith at least one storage error of a plurality of storage-error types;
- a first circuit to correct a first-type error of the plurality of storage-error types;
- a second circuit to generate a signal indicating detection of a second-type error of the plurality of storage-error types; and
- a third circuit coupled to one of said first or second circuits to request correction of an error externally to said storage portion.

18. The device of claim 17, further comprising a third circuit to determine at least one syndrome associated with the at least one storage error.

* * * * *